March 7, 1933.  W. C. TROUT  1,900,675
PUMPING POWER
Filed Oct. 22, 1928

Walter C. Trout INVENTOR.
BY Jesse R. Stone
ATTORNEY.

Patented Mar. 7, 1933

1,900,675

UNITED STATES PATENT OFFICE

WALTER C. TROUT, OF LUFKIN, TEXAS

PUMPING POWER

Application filed October 22, 1928. Serial No. 314,117.

My invention relates to that type of mechanism used for supplying power to a plurality of pump rods and is of particular use where a plurality of adjacent oil or other wells are to be pumped or operated from a single source of power.

It is one of the objects of my improvement to equip the device so that a large number of wells may be connected to the same power and all the pumps thereof operated simultaneously.

Another object is to so construct the power that all the gearing thereof is enclosed, and if desired may be run in a bath of oil.

A further object is to provide a canopy or sheltering cover in connection with my power to protect the crank ring bearings and other moving parts from the elements.

Other and further objects of my improvement such as the simplicity of design and arrangement of the parts, the worm driving gears and the combination of the entire assembly, will be readily apparent to those skilled in the art to which my invention appertains when the following description is considered in connection with the drawing wherein:

Fig. 1 shows a vertical sectional view in elevation of my improved power while

Figure 1:
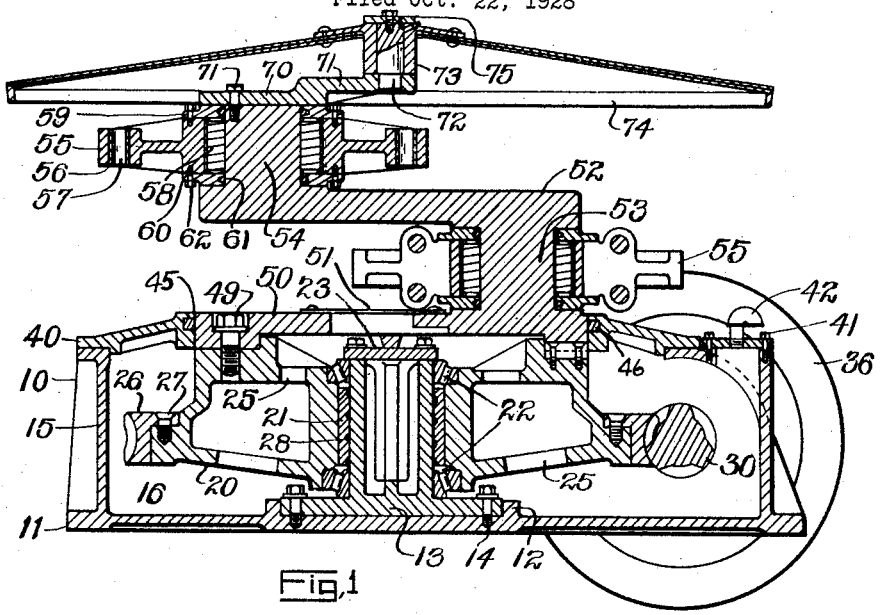

It has been usual in the art to provide powers somewhat similar to the present device but the gearing, gear table and other working parts have been exposed to the elements and rapid deterioration and wear on the parts has resulted.

My improved power consists in a combined table and gear housing designated generally by the numeral 10 which comprises a base 11 which is adapted to be anchored to a concrete or other suitable base by means of anchor bolts. The power must be firmly anchored as the pull on the rods is in a lateral direction. This base 11 has cast or formed integral therewith a central annular thickened portion 12 adapted to receive a stub shaft or axle 13 which is held in place thereon by cap screws 14. The base 11 is also formed with an upstanding flange 15 which forms a housing or basin 16 about the shaft 13.

A horizontally disposed worm gear wheel 20 is mounted for rotation upon the shaft 13 and carries a suitable bearing 21 having lubricating openings 22 and oil pumping grooves 28. On top of this shaft is a plate 23 for retaining the wheel upon the shaft. The wheel has a plurality of openings 25 therethru to permit the free circulation of lubricant pumped up by the grooves 28, as will be later described. A replaceable gear ring 26 is carried by the wheel and held in place by appropriate screws 27.

Figure 2:
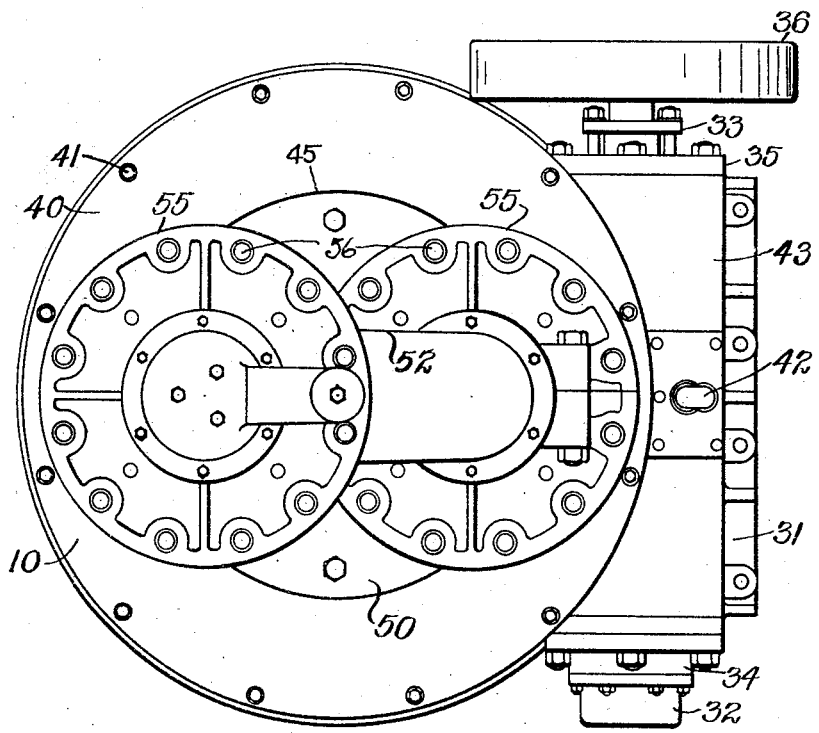
Fig. 2 is a top plan view of the power with canopy removed.

Adapted to engage with the wheel 20 thru the teeth of the ring 26 is a worm shaft 30 disposed also in a horizontal plane. The housing wall or flange 15 and the base 11 are formed on one side with an elongated portion 31, best seen from Fig. 2, which serves as a supporting means for the shaft 30 and has end bearings 32 and 33 carried by the end plates 34 and 35. A fly wheel 36 is mounted on the shaft 30 and may, if desired, be adapted to receive a belt whereby the device receives its power, or an extension shaft, not shown, may be connected to the shaft 30 and the source of power connected thereto.

A suitable cover for the gear housing 10 is shown at 40 and is secured thereto by cap screws 41. A breather pipe is shown at 42, and is supported on a plate 43 adapted to close the worm shaft housing 31, and also form a seat for a portion of the cover 40. Centrally disposed in the cover 40 is an annular opening 45, the cover having a packing 46 therein. The wheel 20 supports by bolts 49 or otherwise a circular table 50 which is adapted to rotate with the wheel and serve as a closure member for the opening 45, a fluid-tight contact being made with the packing 46. A removable disc 51 permits access to the interior of the housing. Integrally formed with the table 50 is a crank arm 52 having the bearing portions 53 and 54 disposed off center with respect to the table 50 and 180° apart with respect to each other. Each of the bearings or wrist pins 53 and 54 carry a crank ring 55 which has a plurality of openings 56 therein; each opening contains a suitable bushing 57 and is adapted to receive a connection with a pull rod upon which a pull is to be exerted for the operation of pump jacks located at a distance from the power. The rings 55 are in contact with the crank shaft thru steel roller bearings 58 which are protected from wear by the mud rings 59 and 60 each of which carries a small packing ring 61 and is held on the crank ring by cap screws 62. The lower crank rings are preferably formed of two halves and are thus adjustable for wear upon the crank.

Surmounting the end of the crank shaft is a canopy arm 70 attached to the shaft by bolts 71. This arm is in a sense a continuation of the crank shaft and extends in a horizontal plane over the shaft 52 to a point directly over the stub shaft 13. The end of this arm 70 has thereon a pin 72 to receive the cap 73 which, in turn, carries the canopy 74. The cap is held in place on the pin 72 by means of a bolt, and disc 75.

From the foregoing it will be apparent that a simplified structure has been evolved. In operation the interior of the housing 16 is partially filled with a proper lubricant by removing the disc 51, or the breather pipe 42. The worm wheel 20 and worm shaft 30 thus run in a bath of oil and rotation of the worm wheel 20 draws oil into the lower oil passages 22 and the traveling spiral grooves 28 carry it upwardly forcing it out of the upper passages 22 so that it may return to the bottom thru the openings 25. The housing 10 it will be seen is entirely closed to prevent the entrance of sand, dirt and grit. The bearings 58 are amply lubricated by means of covered oil vents not shown. The entire closure of the gear housing by the crank shaft and the shelter provided by the canopy are valuable improvements and form an important part of the invention.

What I claim is:

1. A pumping power comprising in combination a housing adapted to contain lubricant, a worm wheel and worm shaft disposed in said housing, a crank table carried by said wheel and serving as a closure for said housing, a crank arm supported by said table, crank rings on said arm and a canopy surmounting and rotatable with said arm.

2. A pumping power including a crank arm, completely enclosed driving gear for said arm and a protecting canopy carried by said arm.

3. In a device of the character described, a base member adapted to serve as a lubricant receptacle, driving gear mounted on said base to rotate in the lubricant, a cover for said base, and a crank table formed to cooperate with said cover to completely close said base, a crank arm carried by said table and having crank rings thereon, said crank table being driven by said gear.

4. A pumping power including a drive shaft, a driven wheel disposed in the same horizontal plane as said shaft, a receptacle surrounding said shaft and wheel, a cover for said receptacle, a crank table adapted to seat in said cover to completely close said receptacle and rotate with said wheel, a crank carried by said table, crank wheels on said crank and a breather pipe for said receptacle.

5. In a pumping power; a combination base and lubricant receptacle, a vertically disposed stub shaft in said base, a worm wheel mounted on said shaft and adapted to rotate in said receptacle, a drive shaft therefor, a crank table closing the top of said receptacle, a crank arm and crank rings carried by said table, said table being driven by said gear.

6. In a pumping power, a combination base and lubricant receptacle, a vertically disposed stub shaft in said base, a worm wheel mounted on said shaft and adapted to rotate in said receptacle, a drive shaft therefor, a crank table driven by said worm, a crank arm and crank rings carried by said wheel, and a canopy surmounting said crank.

7. A dustproof pumping power comprising a completely closed housing, a drive shaft and driven wheel in said housing, a crank table driven by said wheel and forming a portion of said housing, a self-oiling bearing for said driven wheel, and a crank arm and crank rings carried by said table, said crank rings being eccentric relative to said drive shaft.

8. A pumping power including a closed housing, a stub shaft therein, a worm wheel rotatable on said shaft, means to rotate said wheel, a crank arm rotated by said wheel, crank rings on said crank arm mounted eccentrically of said stub shaft and means on said crank arm to cover and protect said arm and rings.

9. In a pumping power an eccentric crank arm, a canopy arm carried by said crank, and a canopy for said power disposed on said arm concentrically of said power.

In testimony whereof I hereunto affix my signature this 15 day of October, A. D. 1928.

WALTER C. TROUT.